W. G. CHIPLEY.
FELLY AND TREAD CONSTRUCTION FOR WHEELS.
APPLICATION FILED FEB. 18, 1919.
1,321,719.
Patented Nov. 11, 1919.
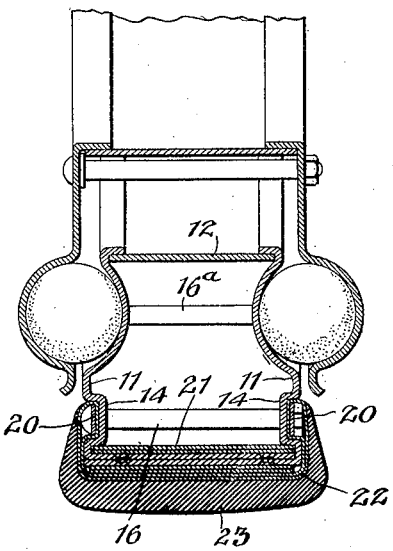
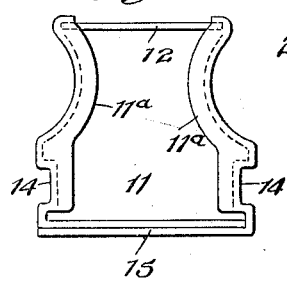
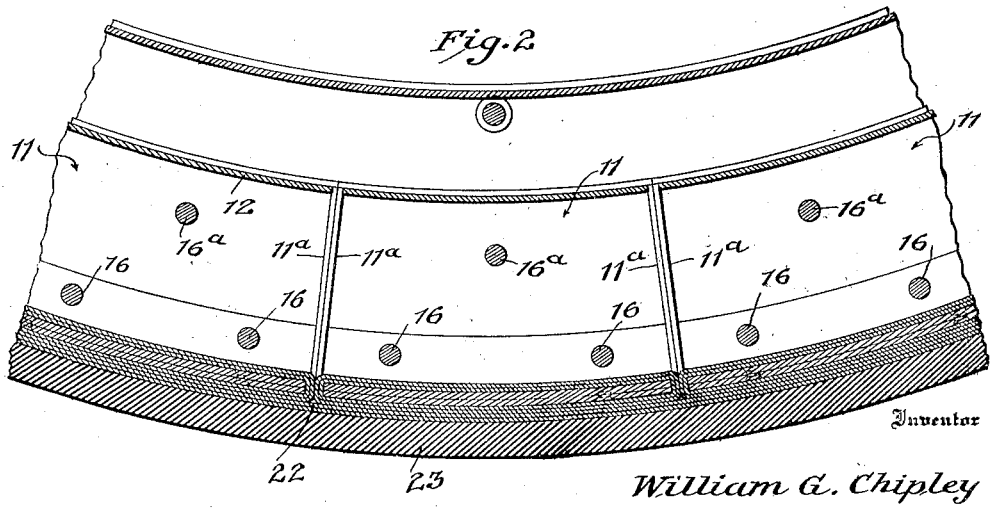
Inventor
William G. Chipley
By Mason Fenwick Lawrence,
Attorneys

UNITED STATES PATENT OFFICE.

WILLIAM GALT CHIPLEY, OF OMAHA, NEBRASKA.

FELLY AND TREAD CONSTRUCTION FOR WHEELS.

1,321,719.  Specification of Letters Patent.  Patented Nov. 11, 1919.

Original application filed June 17, 1918, Serial No. 240,535. Divided and this application filed February 18, 1919. Serial No. 277,770.

*To all whom it may concern:*

Be it known that I, WILLIAM G. CHIPLEY, a citizen of the United States, residing at Omaha, in the county of Douglas and State of Nebraska, have invented certain new and useful Improvements in Felly and Tread Construction for Wheels; and I do hereby declare the following to be a full, clear, and exact description of the invention, such as will enable others skilled in the art to which it appertains to make and use the same.

This invention relates to improvements in vehicle wheels, and more especially to an improvement in and the manufacture of rims and noise-deadening treads or tires for wheels.

It is one of the objects of the present invention to provide a rim structure which is of such design as to be relatively light, durable, of great strength, and which may be readily provided with a noise-deadening tire or tread band.

Another object of the invention is to provide an improved tread band for wheels, which band is of such construction and method of manufacture that it may be built up as a substantially rigid part of the rim and which may be readily renewed to replace wear and damage as incident to the use of the wheel.

With the above and other objects in view as will be rendered manifest to those versed in the art, the invention consists in the construction, the combination, and in details and arrangements of the parts as more fully hereinafter described relative to the embodiments of the invention shown in the accompanying drawings, in which Figure 1 is a transverse radial section through the tire as arranged in combination with a resilient wheel structure;

Fig. 2 is a central longitudinal section through the form of wheel illustrated in Fig. 1;

Fig. 3 is an end elevation of one of the segments.

In the form of the invention shown in Figs. 1, 2 and 3, the rim is built up of a series of segments comprising segmental plates 11, the end edges of which are inwardly flanged as at 11ª in Fig. 3, and the tread elements indicated at 15 are also of short segments and preferably of double ply as clearly shown, to give the desired strength and rigidity in the building up of the cushioning tread or tire. The tread member 15 of each segment of the rim is wound with one or more layers 21 of fabric or other suitable material, and the several segmental sections are then suitably assembled to make a complete annular rim, after which wrapping or winding 22 of fabric or other appropriate material is placed around the perimeter of the rim organization. The marginal portions of the wrappings being laid into the rabbets 14 and hoops 20 applied. This serving not only in this case to bind the wrapping 22 finally in passing above the perimeter of the rim, but also to key these segmental elements of the rim, fastening bolts 16 or passed through the clamping hoops 20 and tightened up; after which the marginal portions of the wrapping 22 extends upwardly over the heads or ends of the bolts, and laid on the peripheral surface of the structure, and then a suitable layer or thickness of rubber or other desired tread forming material is vulcanized, cemented or otherwise secured to the fabric wrapping.

As clearly shown in Fig. 3, the tread forming parts 15 are shown as made integrally with the side members 14 of respective parts, which tread portions are overlapped when the sides are assembled. The shorter or inner arcuate edges of the side members 14 are formed with internal seats to receive segments of a spacing ring 12. The side parts being secured together and clamping the ring pieces 12 by means of bolts 16ª.

The side members are provided with concaved seats 13 to receive cushioning elements 17 upon which are pressed the adjacent annular portions of a central wheel structure.

This application is the division of my application Serial Number 240535, filed June 17, 1918.

What is claimed is:

1. In a wheel, a rim structure comprising an annular body formed of a series of endwise abutting hollow sections each having a tread part with a vulcanizable facing; a vulcanizable tread band combined with the facing of the tread parts; and means for securing the body sections in organized relation.

2. In a wheel, a rim structure comprising an annular body formed of a series of endwise abutting hollow sections each having a tread part with a vulcanizable facing; a vulcanizable tread band combined with the facing of the tread parts; and means for securing the body sections in organized relation, a fabric wrapper being interposed between the band and the facings.

3. In a wheel, a rim structure comprising an annular body formed of a series of endwise abutting hollow sections, a tread support extending from side to side of the section and an inner spacing segment; a vulcanizable tread band vulcanized to the tread support, and means for securing the members of the sections in organized relation.

4. In a wheel, a rim structure comprising an annular body formed of a series of endwise abutting hollow sections, a tread support extending from side to side of the section and an inner spacing segment; a vulcanizable tread band vulcanized to the tread support, and means for securing the members of the sections in organized relation, the tread structures being integrally connected to their respective side members of the sections.

In testimony whereof I affix my signature.

WILLIAM GALT CHIPLEY.

Copies of this patent may be obtained for five cents each, by addressing the "Commissioner of Patents, Washington, D. C."